No. 847,765. PATENTED MAR. 19, 1907.
J. C. HALL.
BREAD MIXER.
APPLICATION FILED NOV. 26, 1906.

UNITED STATES PATENT OFFICE.

JULIUS C. HALL, OF WALLINGFORD, CONNECTICUT.

BREAD-MIXER.

No. 847,765.   Specification of Letters Patent.   Patented March 19, 1907.

Application filed November 26, 1906. Serial No. 345,030.

*To all whom it may concern:*

Be it known that I, JULIUS C. HALL, a citizen of the United States, residing at Wallingford, in the county of New Haven and State of Connecticut, have invented a new and useful Improvement in Bread-Mixers; and I do hereby declare the following, when taken in connection with the accompanying drawings and the letters of reference marked thereon, to be a full, clear, and exact description of the same, and which said drawings constitute part of this specification, and represent, in—

Figure 1:
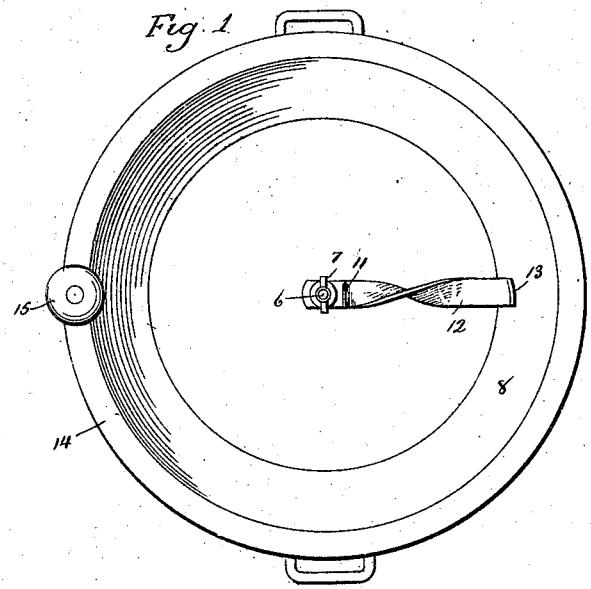
Figure 2:
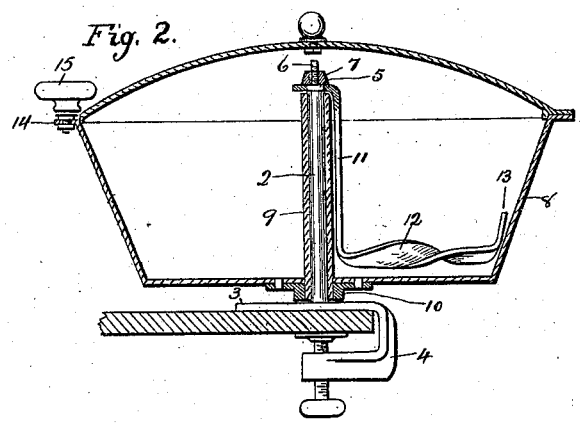

Figure 1, a top or plan view of a bread-mixer constructed in accordance with my invention with the cover removed; Fig. 2, a sectional view of the same, showing the pan provided with a cover.

This invention relates to an improvement in bread-mixers, and particularly to that class which includes a pan adapted to be rotated upon a spindle to which a beater is attached; and the invention consists in the construction hereinafter described, and particularly recited in the claims.

In carrying out my invention I mount a post 2 upon the top plate 3 of a clamp 4, which is adapted to be secured to the edge of a table or other convenient point. Just below its upper end the post is formed with an angular shoulder 5, while the extreme end 6 is threaded to receive a thumb-nut 7. The pan 8 is a circular pan like an ordinary bread-pan except that it is formed with a centrally-arranged vertical sleeve 9, adapted to set over the post 2, the sleeve 9 extending through the bottom of the pan into a collar 10, which is secured to the bottom of the pan, not only tending to support the sleeve, but forming a bearing to rest upon the plate 3 of the clamp. Setting over the squared upper end of the post 2 is a beater 11, having an arm 12 arranged at right angles thereto and an upwardly-extending lip 13 at the outer end. The beater 11 extends downward close to the sleeve 9, while the arm 12 is located slightly above the bottom of the pan and is twisted longitudinally, while the lip 13 projects slightly outward, according to the inclination of the sides of the pan. This beater is clamped to the post by the thumb-nut 7, so as to stand stationary with relation thereto. The pan is provided on one side of its flange 14 with a knob-like handle 15, by which it may be conveniently rotated. The dough having been mixed in the pan, the pan is rotated by its handle 15, which gives the same effect to the dough as though the beater were revolved. Owing to the spiral arrangement of the beater-arm, the dough is moved toward or from the center, so that it is thoroughly kneaded.

It will be seen that the construction above described is one of extreme simplicity, and consequently can be produced at a low cost for manufacture and its operation readily understood by any one.

I claim—

1. The combination with a vertically-arranged stationary post, of a pan having a centrally-arranged vertical sleeve adapted to set over said post, a beater secured to the top of said post extending downward into said pan, and a handle at one side of said pan by which it may be rotated, substantially as described.

2. The combination with a vertically-arranged stationary post, of a pan having a centrally-arranged vertical sleeve adapted to set over said post, a beater secured to the top of said post and held stationary therewith, the said beater extending downward into said pan and provided at its lower end with a longitudinally-twisted arm extending outward therefrom, substantially as described.

3. The combination with a vertically-arranged stationary post, of a pan having a centrally-arranged vertical sleeve adapted to set over said post, a beater secured to the top of said post and held stationary therewith, the said beater extending downward into said pan and provided at its lower end with a longitudinally-twisted arm extending outward therefrom, and terminating in an upwardly-turned lip, substantially as described.

In testimony whereof I have signed this specification in the presence of two subscribing witnesses.

JULIUS C. HALL.

Witnesses:
FREDERIC C. EARLE,
CLARA L. WEED.